United States Patent
Okuda et al.

(10) Patent No.: US 10,928,713 B2
(45) Date of Patent: Feb. 23, 2021

(54) DISPLAY DEVICE, DISPLAY METHOD AND GAME MACHINE

(71) Applicant: Omron Corporation, Kyoto (JP)

(72) Inventors: Mitsuru Okuda, Kyoto (JP); Junya Fujita, Kyoto (JP); Jun Kishimoto, Kyoto (JP); Masanori Mori, Kyoto (JP); Shohei Hisaki, Kyoto (JP); Shogo Ikeda, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/282,074

(22) Filed: Feb. 21, 2019

(65) Prior Publication Data

US 2019/0285971 A1 Sep. 19, 2019

(30) Foreign Application Priority Data

Mar. 19, 2018 (JP) .............................. JP2018-050671

(51) Int. Cl.
*G03B 21/14* (2006.01)
*H04N 13/363* (2018.01)
(Continued)

(52) U.S. Cl.
CPC .......... *G03B 21/142* (2013.01); *G02B 6/0031* (2013.01); *H04N 9/315* (2013.01); *H04N 13/363* (2018.05)

(58) Field of Classification Search
CPC .... G03B 21/142; H04N 13/363; H04N 9/315; H04N 13/356; G02B 6/0031; G02B 6/0036; G02B 6/006; A63F 13/25
See application file for complete search history.

(56) References Cited

U.S. PATENT DOCUMENTS 5,678,910 A * 10/1997 Martin ................. G03B 21/562
353/7
6,141,034 A * 10/2000 McCutchen ......... H04N 13/194
348/36
(Continued)

FOREIGN PATENT DOCUMENTS

CN       101038421 A    9/2007
JP       2001208968 A   8/2001
(Continued)

OTHER PUBLICATIONS

Search Report issued in Chinese Application No. 201910113910.3; dated Jul. 30, 2020 (2 pages).

(Continued)

*Primary Examiner* — Michelle M Iacoletti
*Assistant Examiner* — Magda Cruz
(74) *Attorney, Agent, or Firm* — Osha Bergman Watanabe & Burton LLP

(57) ABSTRACT

A display device has a projector having a light guide plate that guides light incident from an end portion and deflects the light guided to emit the light from a projection surface facing a viewer in a first direction, the projector being configured to emit light from the projection surface to project an image in a space viewable by the viewer, and a rotator configured to rotate the projector around the first direction. When a first end on the projection surface is located at a first position being an upper side in a second direction orthogonal to the first direction, the image is viewed as a stereoscopic image by the viewer. When the rotator rotates the projector and the first end is located at a second position different from the first position, the image is viewed as a planar image by the viewer.

14 Claims, 11 Drawing Sheets

(51) Int. Cl.
*H04N 9/31* (2006.01)
*F21V 8/00* (2006.01)

(56) References Cited

U.S. PATENT DOCUMENTS

| | | | | |
|---|---|---|---|---|
| 6,183,088 B1* | 2/2001 | LoRe | ............... | H04N 13/393 |
| | | | | 353/7 |
| 6,554,430 B2* | 4/2003 | Dorval | ............... | G09G 3/002 |
| | | | | 353/7 |
| 10,067,634 B2* | 9/2018 | Ames | ............... | G06F 3/04815 |
| 2001/0021005 A1* | 9/2001 | Kuiseko | ............... | G03B 21/005 |
| | | | | 353/33 |
| 2002/0001030 A1* | 1/2002 | Kuiseko | ............... | H04N 13/398 |
| | | | | 348/51 |
| 2005/0062684 A1* | 3/2005 | Geng | ............... | G09G 3/002 |
| | | | | 345/32 |
| 2008/0036969 A1* | 2/2008 | Otsuka | ............... | G09F 19/14 |
| | | | | 353/7 |
| 2010/0259599 A1* | 10/2010 | Otsuka | ............... | G02B 30/50 |
| | | | | 348/46 |
| 2013/0113788 A1 | 5/2013 | Schuck | | |
| 2015/0009303 A1* | 1/2015 | Zuidema | ............... | G06F 1/1694 |
| | | | | 348/51 |
| 2015/0082180 A1* | 3/2015 | Ames | ............... | G06F 3/04815 |
| | | | | 715/738 |
| 2017/0251205 A1 | 8/2017 | Zuidema et al. | | |

FOREIGN PATENT DOCUMENTS

| | | |
|---|---|---|
| JP | 2009-216933 A | 9/2009 |
| JP | 2015-510710 A | 4/2015 |

OTHER PUBLICATIONS

Office Action issued in Chinese Application No. 201910113910.3; dated Aug. 5 2020 (14 pages).

* cited by examiner

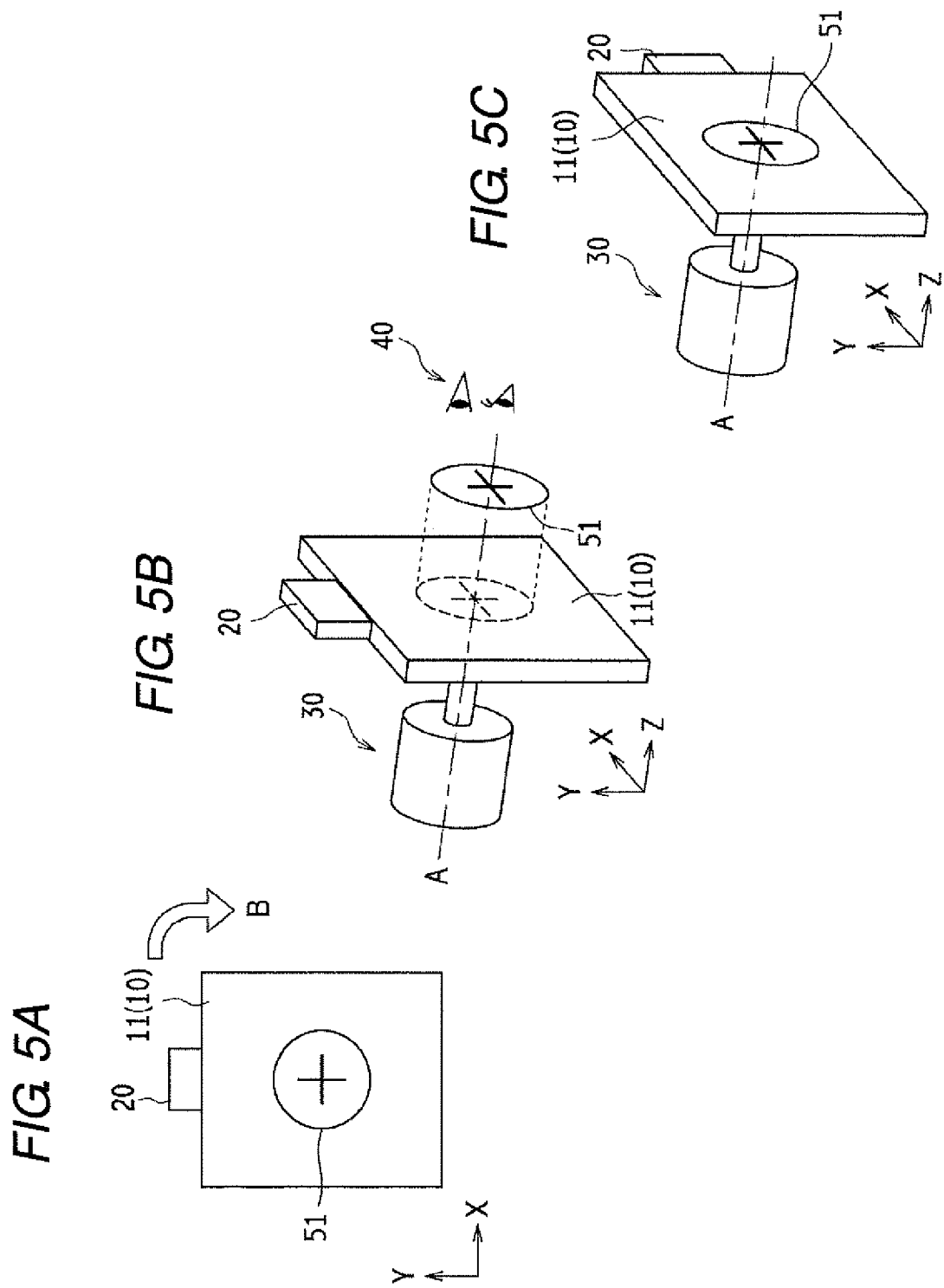

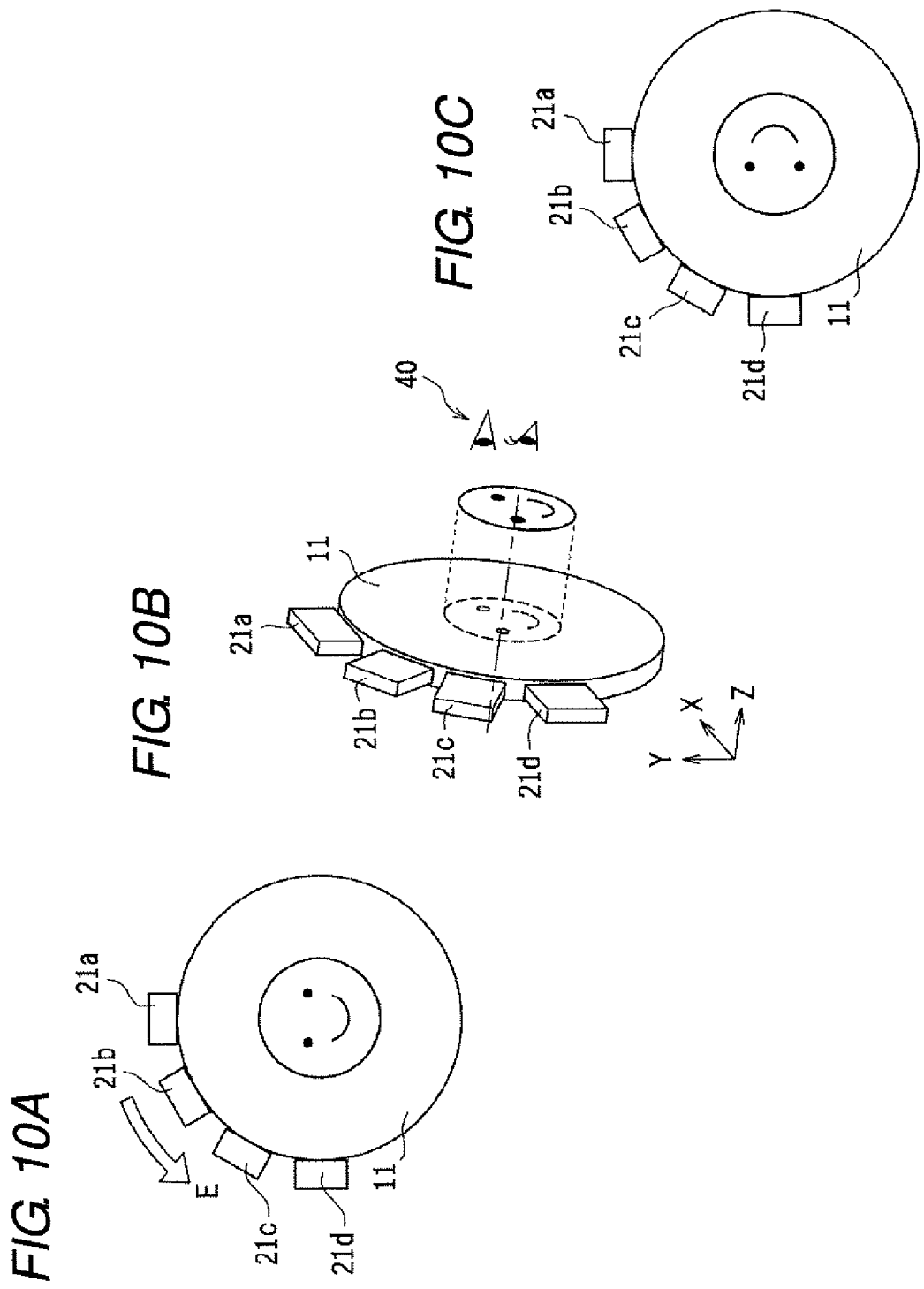

DISPLAY DEVICE, DISPLAY METHOD AND GAME MACHINE

CROSS-REFERENCE TO RELATED APPLICATION

This application claims priority to Japanese Patent Application No. 2018-050671 filed with the Japan Patent Office on Mar. 19, 2018, the entire contents of which are incorporated herein by reference.

BACKGROUND

Field

The present invention relates to a display device, a display method, and a game machine for displaying a stereoscopic image.

Related Art

Conventionally, a display device enabling a viewer to recognize a stereoscopic image, namely a three-dimensional image, has been proposed. In recent years, in order to make a stereoscopic image viewable without spectacles, there has also been provided a display device, such as a liquid crystal display device, including a parallax generating optical element for generating parallax, such as a lenticular lens. In this display device, an image is displayed in a state where parallax has been generated for the right eye and for the left eye by light transmitted through the parallax generating optical element, and the viewer recognizes the image as a stereoscopic image.

There are also cases where, depending on an image, it may be better to see the image as a planar image, namely a two-dimensional image, and a device has thus been provided which is capable of selectively using planar image display and stereoscopic image display according to the viewer's intention.

For example, in a display device described in Japanese Translation of PCT International Application Publication No. 2015-510710, the front surface of the device is the surface for displaying a stereoscopic image, and the back surface thereof, namely making the 180-degree reversed surface, is the surface for displaying a planar image. The viewer can turn the device upside down according to the application and the like, to see the three-dimensional image and the two-dimensional image.

Further, in a display device described in Japanese Unexamined Patent Application Publication No. 2009-216933, a parallax generating optical element such as a lenticular lens can be detachably disposed on an organic EL screen that displays an image. When a viewer is to see a three-dimensional image, parallax generating optical element is provided on the organic EL screen. When the viewer is to see a two-dimensional image, the parallax generating optical element is removed from the organic EL screen and the viewer directly sees the organic EL screen.

Meanwhile, in the conventional device capable of selectively using a three-dimensional image and a two-dimensional image, each of a screen for a three-dimensional image and a screen for a two-dimensional image is required as in the device of Japanese Translation of PCT International Application Publication No. 2015-510710, or a parallax generating optical element is required on an image display screen as in the device of Japanese Unexamined Patent Application Publication No. 2009-216933. That is, for seeing the same image stereoscopically, an individual screen is required or an accessory such as a lens is required, and hence the conventional device has not been able to realize both stereoscopic viewing and plan viewing without the accessory on one display screen.

In addition, the proper selection between three-dimensional image and the two-dimensional image has been made by the viewer's physical operation based on the viewer's intention, and has not been automatically made.

SUMMARY

There is a visual effect that a three-dimensional image appears to jump out in front of the eyes at the moment when the viewer looks at the image, but when the viewer sees the same image for a certain amount of time, the freshness of what appears stereoscopically disappears and the visual effect diminishes.

One or more embodiments of the present invention provides a display device capable of automatically selecting and displaying a stereoscopic image (three-dimensional image) and a planar image (two-dimensional image) on one display screen without the need for an accessory such as a lens.

One or more embodiments of the present invention is directed to a display device including: a projector having a light guide plate that guides light incident from an end portion and deflects the light guided to emit the light from a projection surface facing a viewer in a first direction, the projector being configured to emit light from the projection surface to project an image in a space viewable by the viewer; and a rotator configured to rotate the projector around the first direction, in which when a first end on the projection surface is located at a first position being an upper side in a second direction orthogonal to the first direction, the image is viewed as a stereoscopic image by the viewer, and when the rotator rotates the projector and the first end is located at a second position different from the first position, the image is viewed as a planar image by the viewer.

Further, the display device may be a display device in which the second position is an upper side in a third direction orthogonal to the first direction and the second direction.

Further, the display device may be a display device in which the rotator is connected to a back surface of the projection surface of the projector to rotate the projector.

Further, the display device may be a display device in which the rotator is connected to a side end portion of the projection surface of the projector to rotate the projector.

Further, the display device may include a light source in which the light source extinguishes light when the rotator rotates the projector, and the light source emits light when the first end of the projector is located at the second position.

Further, the display device may be a display device in which the light source moves with rotation of the projector.

Further, the display device may be a display device in which a plurality of the light sources are provided, and when the first end is located at the second position, a light source emits light, the light source being different from the light source that emits light when the first end is located at the first position.

Further, the display device may be a display device in which the rotator may rotate the projector at a timing not based on viewer's intention.

Further, a game machine according to one or more embodiments of the present invention includes the display device having one of the configurations described above.

A display method according to one or more embodiments of the present invention in a display device including a projector having a light guide plate that guides light incident from an end portion and deflects the light guided to emit the light from a projection surface facing a viewer in a first direction, the projector being configured to emit light from the projection surface to project an image in a space viewable by the viewer and a rotator configured to rotate the projector around the first direction, the display method includes: a stereoscopic image viewing step in which the rotator rotates the projector such that a first end on the projection surface is located at a first position being an upper side in a second direction orthogonal to the first direction, to cause the viewer to view the image as a stereoscopic image; and a planar image viewing step in which the rotator rotates the projector such that the first end is located at a second position different from the first position, to cause the viewer to view the image as a planar image.

In one or more embodiments of the present invention, it is possible to provide a display device capable of automatically selecting and displaying a stereoscopic image (three-dimensional image) and a planar image (two-dimensional image) on one display screen without the need for an accessory such as a lens.

BRIEF DESCRIPTION OF THE DRAWINGS

FIG. 1A illustrates a state in which an image is viewed as a stereoscopic image, and FIG. 1B illustrates a state where an image is viewed as a planar image;

FIG. 3 is a schematic front view of the display device 1 illustrated in FIG. 1A as seen from the direction of arrow a;

FIGS. 5A to 5C are schematic views each illustrating a display device 1 for displaying an image different from the image illustrated in FIG. 1, where FIG. 5A is a schematic front view illustrating a state in which an image is viewed as a stereoscopic image, FIG. 1B is a schematic perspective view illustrating a state in which an image is viewed as a stereoscopic image, and FIG. 5C is a schematic perspective view illustrating a state in which an image is viewed as a planar image;

FIG. 6A is a top view of a light guide plate 11 having a square shape, FIG. 6B is a top view of a light guide plate 11 having a circular shape, and FIG. 6C is a perspective view of a light guide plate 11 having a curved surface:

FIGS. 10A to 10C are schematic views each illustrating the relationship between a light source 20 and a light guide plate 11 of a fifth embodiment, where FIG. 10A is a schematic front view illustrating a state in which an image is viewed as a stereoscopic image, FIG. 10B is a schematic perspective view illustrating a state in which an image is viewed as a stereoscopic image, and FIG. 10C is a schematic perspective view illustrating a state in which an image is viewed as a planar image;

FIG. 11A is a schematic perspective view of the display device 1, FIG. 11B is a sectional view obtained by cutting out FIG. 11A along line XIb-XIb, and FIG. 11C is a schematic view of a base plate 31a as seen from above; FIG. 12A is a schematic perspective view of the display device 1, FIG. 12B is a sectional view obtained by cutting out FIG. 12A along line XIIb-XIIb, and FIG. 12C is a schematic view of a base 37 as seen from above.

DETAILED DESCRIPTION

First Embodiment

Figure 1A:
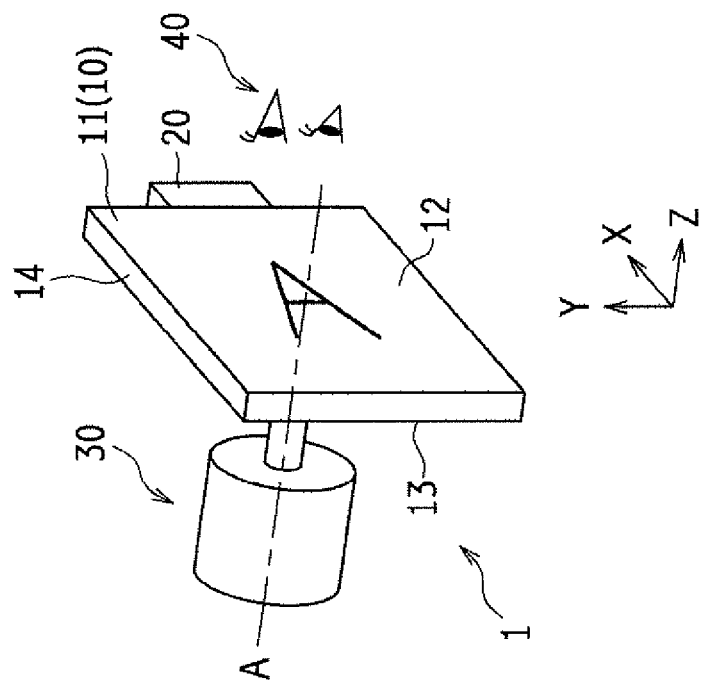
FIGS. 1A and 1B are schematic perspective views each illustrating a display device 1 according to a first embodiment, where

Hereinafter, embodiments of the present invention will be described in detail with reference to the drawings. Identical or equivalent constituent elements, members, and processes illustrated in the drawings are denoted by the same reference numerals, and redundant descriptions will be omitted as appropriate. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A display device according to one or more embodiments of the present invention may be provided not only as a single unit that displays an image to a viewer but also as a member provided in a game machine, the member exerting a visually appealing presentation effect. Alternatively, the display device may be provided as one of members provided in various kinds of toys and learning devices for infants and the like, the members exerting visually appealing presentation effects. In addition, the display device may be incorporated in various apparatuses as a member that exerts a visually appealing presentation effect or a member that makes an image viewed as a stereoscopic image.

Figure 1B:
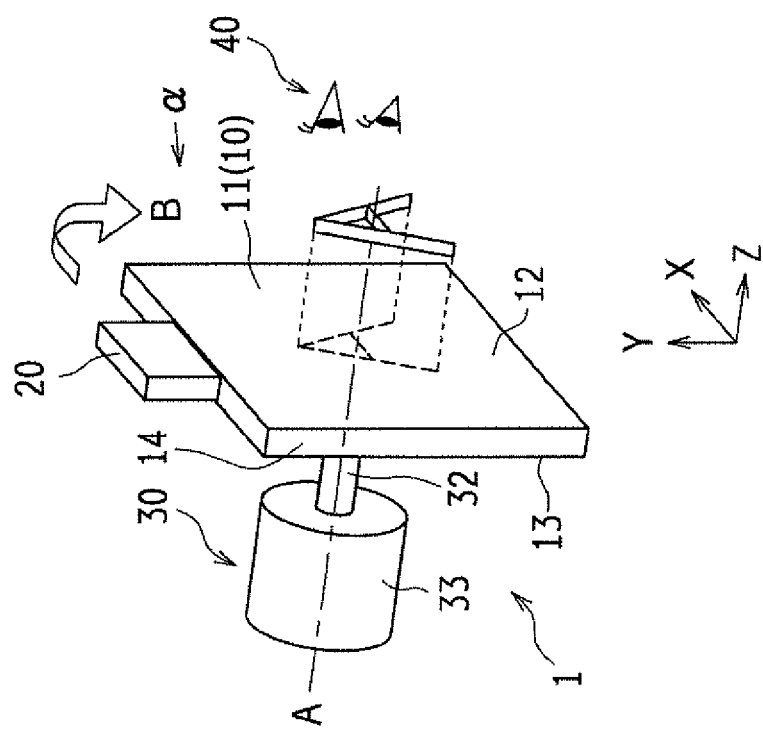

FIGS. 1A and 1B are schematic perspective views each illustrating a display device 1 according to a first embodiment, where FIG. 1A illustrates a state in which an image is viewed as a stereoscopic image, and FIG. 1B illustrates a state where an image is viewed as a planar image.

Figure 2:
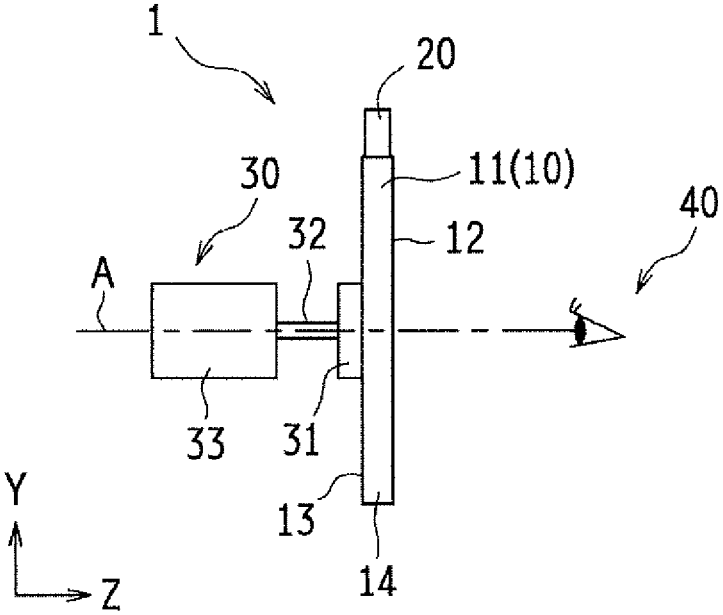
FIG. 2 is a schematic side view of FIG. 1A.

FIG. 2 is a side view of the display device 1 illustrated in FIG. 1A.

Figure 3:
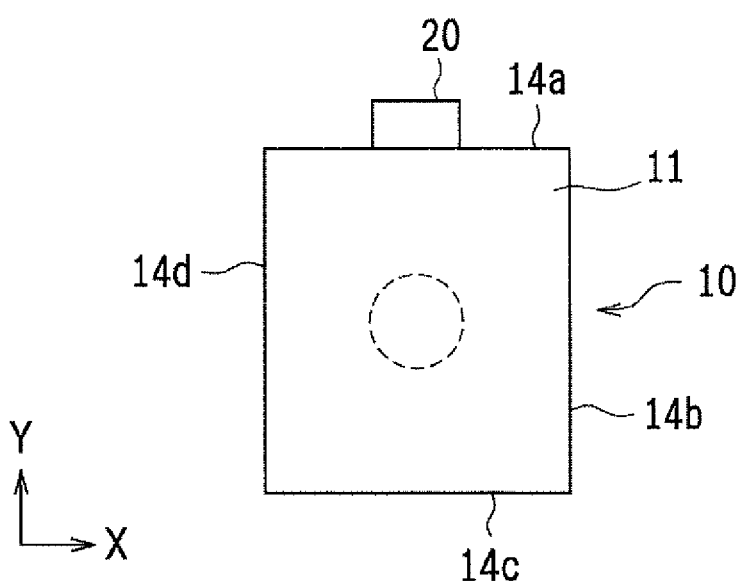

FIG. 3 is a schematic front view of the display device 1 illustrated in FIG. 1A as seen from a direction of arrow a, and an image to be displayed is not illustrated for the sake of convenience.

The display device 1 of the embodiment includes a projector 10, a light source 20 that emits light to the projector 10, a rotator 30 that is connected to the projector 10 and rotates the projector 10, and a controller, not illustrated, that controls the driving of the light source 20, the rotator 30, and the like. In the display device 1, when the projector 10 is at a first position illustrated in FIG. 1A, namely, the light source 20 is on an upper side in a Y direction, a viewer 40 views an image as a stereoscopic image. On the other hand, when the projector 10 is at a second position illustrated in FIG. 1B, namely, the light source 20 is in an X direction, the viewer 40 views the image as a planar image. Hereinafter, the position of the projector 10 (light guide plate 11) where an image is viewed as a stereoscopic image by the viewer 40 is referred to as a first position, and the position rotated 90 degrees from the first position is referred to as a second position. In one or more embodiments of the present invention, the first position is a position where the image is viewed as a stereoscopic image by the viewer 40, and the second position is a position which is not limited to the position rotated 90 degrees, but includes other positions as long as being positions where the image is viewed as a planar image by the viewer 40.

In one or more of the above embodiments, the projector 10 is the light guide plate 11, but the present invention is not limited thereto. The projector 10 internally has a projector that has a light guide plate (light guide unit) 11 and changes an optical path of light from the light source 20 on the inside of the light guide plate 11 to project an image from the projection surface of the projector 10. For example, the projector 10 includes a projector in which a light guide path for guiding light from the light source 20 is included in the light guide plate 11.

The light guide plate 11 is a flat plate formed of a transparent resin material having a relatively high refractive index. A material for forming the light guide plate 11 may, for example, be polycarbonate resin (PC), polymethyl methacrylate resin (PMMA), glass, or the like. In this manner, since the light guide plate 11 is transparent, almost all the light from a back surface 13 passes therethrough, and a matter on the back surface 13 of the light guide plate 11 can also be viewed. Therefore, it is also possible to dispose a liquid crystal display device or the like on the back surface 13 side and superimpose and display the image of the liquid crystal display device and the image from the light guide plate 11.

The light guide plate 11 is a quadrangular flat plate made up of a main surface (projection surface) 12 that faces the viewer 40 and emits light from the light source 20, the back surface 13 that is a back surface of the main surface 12 and is connected to the rotator 30, a side surface 14 located between the main surface 12 and the back surface 13. As illustrated in FIG. 3, as for the side surface 14, namely, the side ends to be four sides of the main surface 12, the side end to which the light source 20 is joined is a first end 14a, and the other sides are a second end 14b, a third end 14c, and a fourth end 14d sequentially clockwise from the first end 14a.

The light source 20 includes a light emitting unit (not illustrated) and its lens, expands light emitted from the light emitting unit so as to have a planar shape in a direction parallel to the main surface 12 with the lens, and makes the light incident from the first end 14a of the light guide plate 11. The structure of the light source 20 is not only the structure provided with the light emitting unit and the lens, but may be any known structure as long as being a structure that guides light to the light guide plate 11. The light guide plate 11 internally changes the optical path of the light incident from the first end 14a, and emits the light from the main surface 12 in a form of light convergence in a predetermined direction to form an image. The light emitting unit can emit and extinguish light based on a control signal of the controller.

Figure 4:
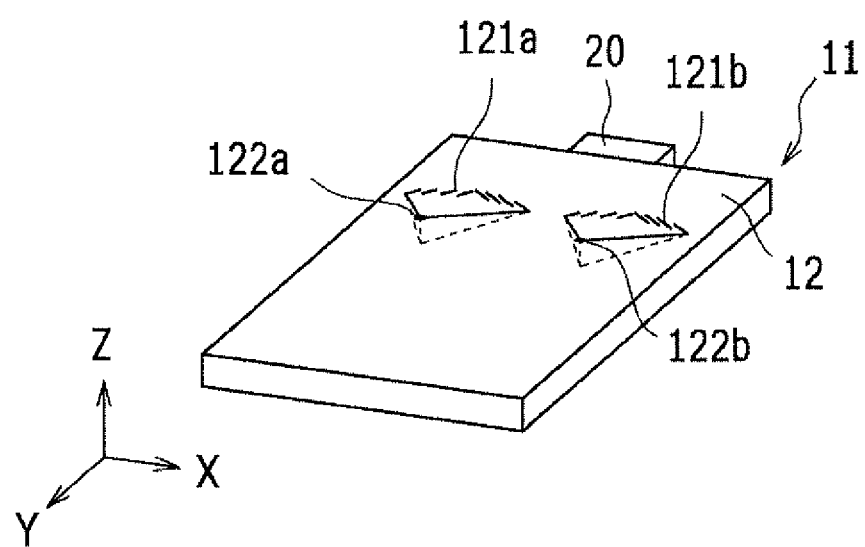
FIG. 4 is a schematic perspective view illustrating a mechanism for displaying an image by a light guide plate 11 in the first embodiment.

A known mechanism described in Japanese Patent No. 5861797, which is hereby incorporated by reference in its entirety, is used as a mechanism of image display in the embodiment. That is, as illustrated in FIG. 4, a plurality of light convergence portions 121 (121a, 121b) made of a plurality of reflective surfaces (prims surfaces) are formed in advance on the main surface 12 of the light guide plate 11 according to an image to be displayed. The light incident from the light source is converged to a predetermined fixed point 122 (122a, 122b) by the light convergence portion 121, and a stereoscopic image is projected onto the space by the converged light. The light convergence portion 121 in the embodiment is formed by continuously arranging a plurality of reflective surfaces along a straight line parallel to the X axis. When the light guide plate 11 is at the first position, the viewer 40 is caused to view the image made up of a plurality of fixed points 122 as a stereoscopic image.

The method of displaying an image according to one or more embodiments of the present invention is not limited to a known method described in Japanese Patent No. 5861797, but may be a known stereoscopic image projecting method such as a method of projecting an image for the right eye and an image for the left eye to display a stereoscopic image by parallax. However, the projector 10 according to one or more embodiments of the present invention is to project a stereoscopic image only with the projector 10, and not to provide an accessory such as a lenticular lens in front of the main surface (projection surface) 12 to cause the viewer to see a stereoscopic image of the projection surface 12.

As illustrated in FIG. 2, the rotator 30 includes a base plate 31, a shaft 32, and a rotation mechanism 33 such as a motor, and the base plate 31 is joined to the center of the back surface 13 of the light guide plate 11. When the rotation mechanism 33 is driven, its driving force rotates the shaft 32 and the base plate 31. By the driving of the rotator 30, the light guide plate 11 rotates around a shaft A as a rotating shaft. Although the motor has been exemplified as the rotation mechanism 33 in the embodiment, the present invention is not limited thereto, and a mechanism with any structure may be used as long as being a mechanism to rotate the shaft 32. As illustrated in FIG. 2, the shaft A extends in a first direction that is a direction in which the viewer 40 and the main surface (projection surface) 12 of the light guide plate 11 face each other. The first direction is parallel to a Z direction. When the light guide plate 11 is at the first position with reference to the first direction, the light source 20 is located on an upper side in the second direction orthogonal to the first direction.

Returning to FIGS. 1A-1B, a display method of a stereoscopic image and a planar image will be described specifically. In a case where a stereoscopic image is to be viewed by the viewer 40 from the projector 10, when light is emitted from the light source 20 while the light guide plate 11 is located at the first position where the light source 20 illustrated in FIG. 1A is located on the upper side in the Y direction, namely, on the upper side in the second direction, a stereoscopic image is formed between the main surface 12 and the viewer 40 or in a space behind the main surface 12 by the known stereoscopic image display mechanism described above. The viewer 40 thus recognizes a stereoscopic image "A" as illustrated in FIG. 1A.

Next, in a case where a planar image is to be viewed by the viewer 40, the light guide plate 11 is rotated 90 degrees clockwise (a direction of arrow B) by the rotator 30, and as illustrated in FIG. 1B, the light guide plate 11 is located at the second position, on the right of which the light source 20 is located, as seen from the viewer 40. That is, the light source 20 is located on an upper side in a third direction orthogonal to the first direction and also orthogonal to the second direction. In this state, when light is emitted from the light source 20 to the light guide plate 11, the image "A" is recognized by the viewer 40 as a planar image in the state of being rotated 90 degrees clockwise.

The rotation direction of the light guide plate 11 is not limited to clockwise but may be counterclockwise. In this case, as seen from the viewer 40, the light source 20 is located on the left side. Therefore, the third direction may be a direction extending from the left to the right when viewed from the viewer 40 (in the clockwise direction) or a direction extending from the right to the left (in the counterclockwise direction).

As described above, the image according to the embodiment is displayed in such a manner that, when the light guide plate 11 is at the first position, the light convergence portion 121, formed by continuously arranging a plurality of reflective surfaces along a straight line parallel to the X axis, converts the light to a specific position. Since the arrangement of the right eye and the left eye of the viewer 40 is also located in the X direction, in the positional relationship in which the light guide plate 11 is at the first position, the arrangement direction of the reflective surfaces of the light convergence portion 121 is substantially parallel to the arrangement direction of the right eye and the left eye of the viewer 40. Therefore, when the viewer 40 sees the image with this positional relationship, the image is viewed as a stereoscopic image. On the other hand, when the light guide plate 11 is rotated so as to be at the second position, the reflective surfaces of the light convergence portion 121 are arranged in the Y direction. Since the eye position of the viewer 40 is the same as that in FIG. 1A, the arrangement direction of the right eye and left eye and the arrangement direction of the reflective surfaces of the light convergence portion 121 are substantially orthogonal. When the viewer sees the image with this positional relationship, the same image is viewed as a planar image.

As thus described, in one or more embodiments of the present invention, the same view is shown to the viewer 40 stereoscopically or planarly to the viewer by using the principle that varying the orientation of the light guide plate 11 makes the same image seen as a stereoscopic image or seen as a planar image. For example, in the embodiment, during rotation of the light guide plate 11, the light source 20 is turned off to bring the display into a dark state. Then, when the light guide plate 11 is located at the second position, the light source 20 is turned on again to display an image on the viewer 40. In this manner, the projector 10 is rotated at the timing not intended by the viewer 40 to control the lighting of the light source 20, whereby, when the display in front of the eyes becomes dark and then becomes bright again, the viewer 40 sees a stereoscopic image, having appeared to rise to the viewer so far, as a planar image, and the viewer 40 is thus given an unexpected surprise.

When the light guide plate 11 is further rotated 90 degrees clockwise from the position of FIG. 1B, the light source 20 comes into the state of being located on a lower side in the Y direction. In this case, the viewer 40 views a stereoscopic image in which "A" is reversed. When the light guide plate 11 is further rotated 90 degrees clockwise, the light source 20 comes into the state of being located on the left as seen from the viewer 40. In this case, the viewer 40 views "A" as a planar image rotated 90 degrees to the left.

By repetition of the rotation in this manner, when the arrangement of the reflective surfaces of the light convergence portion 121 is parallel to the X direction, the image is seen as a stereoscopic image, and when the arrangement of the reflective surfaces is not parallel to the X direction, the image is seen as a planar image. Therefore, a stereoscopic image and a planar image can be caused to appear alternately, and in combination of light emission and light extinction of the light source 20, it is possible to give the viewer 40 a presentation effect of an image rising or retracting the image. In particular, when the display device of one or more embodiments of the present invention is used in a game machine or the like, by the presentation of combining showing the same image as a stereoscopic image and showing it as a planar image at the time of obtaining a score or the like, it is possible to give the viewer 40 fresh visual effects. That is, instead of switching between a stereoscopic image and a planar image in accordance with an instruction from the viewer, the display of the image is switched at a timing not based on the viewer's intention, so that the presentation of combining the stereoscopic display and the planar display for the same image can be performed.

The projector 10 of the embodiment can project a stereoscopic image without using an accessory such as a lenticular lens, and can provide in a switchable manner a stereoscopic image and a planar image to the viewer 40 only with a simple configuration to rotate the projector 10. Further, since a stereoscopic image and a planar image can be displayed on the same screen, it is not necessary to provide a plurality of screens for switching between a stereoscopic image and a planar image. In this manner, a stereoscopic image and a planar image can be viewed with a simple configuration. In addition, since the viewer is caused to view the image without interruption due to mounting or dismounting of the accessory or the like, it is possible to display an image that moves from the switching of a stereoscopic display and a planar display, and provide a fresh presentation effect to the viewer.

Further, the rotation of the projector 10 by the rotator 30 may be performed in accordance with an instruction from the viewer 40. That is, when an instruction signal is input into the controller by the viewer 40 pressing a selection button (not illustrated) for selecting a stereoscopic image, a planar image, the controller outputs a rotation instruction to the rotator 30 in accordance with the instruction signal, and the rotator 30 rotates the projector 10 by a predetermined angle based on the rotation instruction. As a result, a stereoscopic image or a planar image desired by the viewer 40 is projected.

As illustrated in FIG. 5A, when an image 51 has a shape vertically and horizontally symmetrical, even when the light guide plate 11 is rotated from the state viewed as a stereoscopic image as illustrated in FIG. 5B, the image 51 seems to remain unchanged in its orientation as illustrated in FIG. 5C. In this manner, if the image is vertically and horizontally symmetrical, even when the light guide plate 11 is rotated, the viewer 40 views the image as a stereoscopic image and a planar image in the same direction. Therefore, it appears as if the image rises or retracts without giving the impression of image change to the viewer 40, such as the direction change of the image, and the movement gives a presentation effect with more natural movement.

(Modifications of Shape of Projector)

Although the projector 10 in the first embodiment has been the light guide plate 11 having a rectangular flat shape, the present invention is not limited thereto, and the light guide plate 11 having various shapes can be used.

Figure 6A:
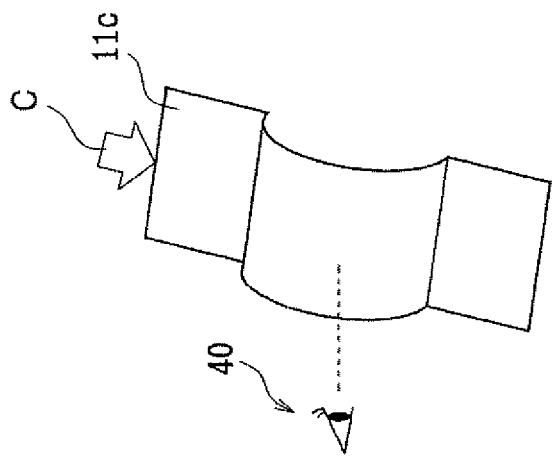
FIGS. 6A to 6C are schematic views each illustrating the shape of the light guide plate 11, where
Figure 6B:
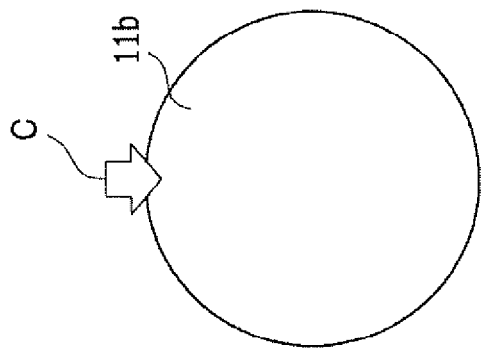
Figure 6C:
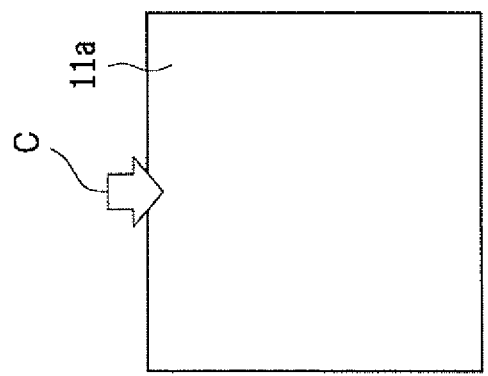

FIGS. 6A to 6C are schematic views showing modifications of the light guide plate 11, and in a case of projecting as a stereoscopic image, the light from the light source 20 is incident from the position indicated by arrow C in either case. That is, FIGS. 6A to 6C illustrate a case when the light guide plate 11 is located at the first position.

For example, as illustrated in FIG. 6A, the light guide plate may be a light guide plate 11a having a square shape, but is not limited to a rectangle or a square one, and may be flat plates of various polygonal shapes. When being regular polygonal, the light guide plate is rotationally symmetric. It is thus possible to make the rotation of the light guide plate 11a hardly noticeable by performing the rotation such that diagonals overlap each other even before and after the rotation, Further, as illustrated in FIG. 6B, the light guide plate may be a light guide plate 11b having a circular flat plate shape. Being circular, the light guide plate 11b always looks the same to the viewer 40 when stopped at any rotation angle, and thus the rotation of the light guide plate 11b is hardly noticed. By combining the vertically and horizontally symmetric images with the light guide plate 11b having a circular flat plate shape, it is possible to switch a stereoscopic image and a planar image without causing the viewer 40 to notice the rotation of the light guide plate 11b at all, and to further improve the presentation effect. Since the distance from the center of the circle, namely, the distance from the rotating shaft is constant in the circular shape, the space required for rotation is always constant irrespective of the rotation angle, and the circular flat plate is also suitable for installation in a case where the arrangement space is restricted.

Further as illustrated in FIG. 6C, a light guide plate 11c may have a curved main surface. Depending on a place to be installed and an image to be displayed, it is also possible to selectively use the light guide plate having the flat plate shape and the light guide plate having the curved surface as described above.

Second Embodiment

A second embodiment will be described with reference to FIG. 7. Descriptions of contents overlapping those in the first embodiment will be omitted.

In the first embodiment, it is configured such that the base plate 31 of the rotator 30 is connected to the back surface 13 of the light guide plate 11 and the light guide plate 11 is rotated. With respect to a portion of the light guide plate 11 connected to the base plate 31 as thus described, transmission of light from the back surface is blocked by the base plate 31, and the translucency of the light guide plate 11 is inferior.

A display device of the embodiment has a structure of a rotator that does not block the back surface 13 of the light guide plate 11.

Figure 7:
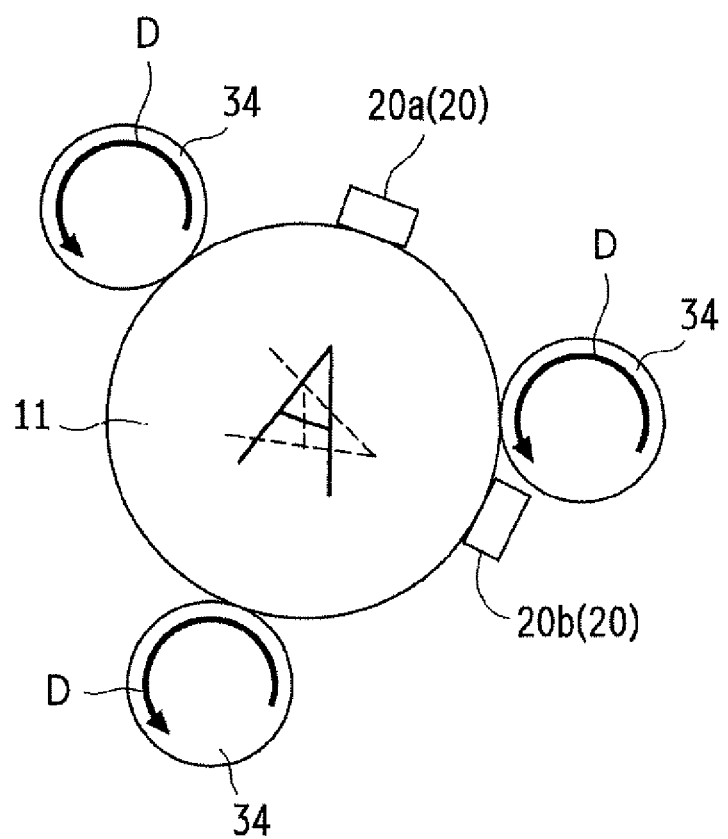
FIG. 7 is a schematic top view illustrating a display device of a second embodiment.

FIG. 7 is a schematic view illustrating the display device 1 of the embodiment.

The light guide plate 11 in the embodiment has a circular flat plate shape. The rotator 30 includes three rotating cylinders 34 and a rotation mechanism such as a motor (not illustrated) for rotating the three rotating cylinders 34. The rotating cylinder 34 has an outer circumference formed of a highly adhesive member such as rubber or urethane, and is disposed such that the outer circumference is in close contact with the side surface of the light guide plate 11. The three rotating cylinders 34 are evenly arranged with respect to the light guide plate 11. In the rotation mechanism for rotating the rotating cylinder 34, separate motors or the like may be provided in the rotating cylinder 34, or the rotational force of one motor may be transmitted to the three rotating cylinders 34 by using a power transmission mechanism such as a belt and a pulley which are known.

When the light guide plate 11 is rotated, the rotation mechanism is driven to rotate the three rotating cylinders 34 in a direction of arrow D. Since the rotating cylinder 34 rotates while being in contact with the light guide plate 11, these rotational forces are transmitted to the light guide plate 11, and the light guide plate 11 rotates with the rotation of the rotating cylinders 34.

In the embodiment, three rotating cylinders 34 have been provided and the light guide plate 11 has been held at three positions. However, the present invention is not limited thereto, and as long as a structure is formed in which the light guide plate 11 is stably held and rotated, the number of rotating cylinders may be two or four, and is not limited.

The light source 20 in the embodiment is not joined to the light guide plate 11 and is disposed at a position close to the side end portion of the light guide plate 11. Light from the light emitting unit (not illustrated) of the light source 20 is incident from the side end of the light guide plate 11, the optical path of the light is changed, and the light is emitted from the main surface as in the first embodiment. The light source 20 is desirably disposed so as to face the side end portion of the light guide plate 11.

With the light source 20 being not joined to the light guide plate 11, the light source 20 cannot follow the rotation of the light guide plate 11. Therefore, in the embodiment, a plurality of light sources 20 are provided. A first light source 20a is provided at a position corresponding to the first position of the light guide plate 11, where the image "A" is seen as a stereoscopic image. A second light source 20b is disposed at a position corresponding to the second position where the light guide plate 11 is rotated 90 degrees from the first position. Specifically, when the viewer 40 is to be caused to view a stereoscopic image, the light guide plate 11 is rotated so as to come to the first position, namely, a position where an image "A" is indicated by a solid line, and light is emitted from the first light source 20a. Next, when the viewer 40 is to be caused to view a planar image, the light guide plate 11 is rotated so as to come to the second position, namely, a position where an image "A" is indicated by a dotted line, and light is emitted from the second light source 20b. By providing the plurality of light sources 20 as thus described, it is possible to display a stereoscopic image and a planar image on the viewer 40 without causing the light source 20 to follow the light guide plate 11.

The switching between turning on and turning off of the first light source 20a and the second light source 20b may be automatically controlled based on the rotation amount of the rotator 30. The switching may be controlled such that a sensor is provided in each of the light sources 20a and 20b and each of the light sources 20a and 20b is turned on at a timing when the sensor recognizes a mark at the side edge of the light guide plate 11. The lighting timing of the light source 20 may be controlled by any method as long as the control is performed based on a known control method.

Note that the light source 20 may be joined to the end portion of the back surface 13 of the light guide plate 11 to follow the rotation of the light guide plate 11. In this case, irradiation with light may be performed from the end portion of the back surface 13, or irradiation with light may be performed from around the side end of the light guide plate 11 by using a light guide path such as an optical fiber from the light source 20. The light guide path is suitably a light guide path with a relatively thin and small structure which does not hinder the contact of the rotating cylinder 34 and the transmission of rotational force.

As thus described, with the configuration of the embodiment, a structure is formed in which nothing is joined to the back surface 13 of the light guide plate 11, particularly the central portion thereof, so that an image can be displayed without impairing the translucency at the center of the light guide plate 11. In addition, by separately providing an image display device or the like on the back surface 13 side of the light guide plate 11 and arranging another image or video such as a background image, variations in presentation that, for example, it is possible to display a stereoscopic image "A" together with a background image, increase.

Third Embodiment

A third embodiment will be described with reference to FIG. 8 Descriptions of contents overlapping those in the first embodiment and the second embodiment will be omitted.

In the second embodiment, the structure has been formed in which the rotating cylinder 34 is provided in close contact with the side surface of the light guide plate 11, and the light guide plate 11 is rotated with the rotation of the rotating cylinder 34. The rotating cylinder 34 has its outer circumference formed of a soft material such as rubber or urethane and is easily brought into close contact with the side surface of the light guide plate 11. However, the rotating cylinder 34 deteriorates due to long-term use and the adhesion to the light guide plate 11 may decrease. Also, the rotating shaft of the rotating cylinder 34 may slightly distort due to long-term use. When the degree of adhesion between the rotating cylinder 34 and the light guide plate 11 changes due to secular change of the rotating cylinder 34, the rotational force of the rotating cylinder 34 may not be sufficiently transmitted to the light guide plate 11, and the rotation amount of the light guide plate 11 may become inaccurate. When the light guide plate 11 is not accurately located in front of the first light source 20a and the second light source 20b, the presentation effect of raising and retracting of the image may somewhat deteriorate.

Figure 8:
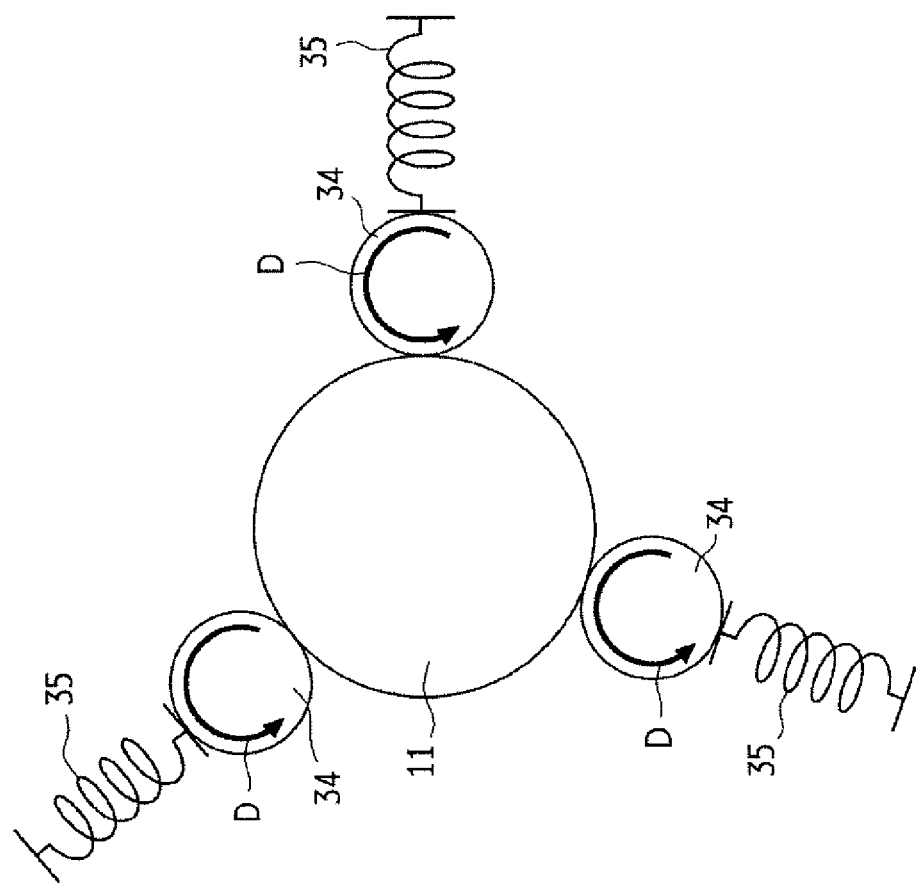
FIG. 8 is a schematic top view illustrating a display device of a third embodiment.

In the embodiment, as illustrated in FIG. 8, by urging the rotating cylinder 34 toward the light guide plate 11 by an urging member 35 such as a spring, the degree of adhesion between the rotating cylinder 34 and the light guide plate 11 is always kept constant.

Specifically, a plurality of the urging members 35 are provided corresponding to the respective rotating cylinders 34. The urging member 35 is a coil spring, one end of which is fixed to a fixing member such as an outer frame of the display device, and the other end of which is in contact with the rotating cylinder 34. The urging member 35 applies a pressing force to the rotating cylinder 34 in a direction to bring the rotating cylinder 34 into close contact with the light guide plate 11. The pressing force has strength such as extent as not to hinder the rotation of the rotating cylinder 34.

By providing the urging member 35 in this manner, the rotating cylinder 34 is always in contact with the light guide plate 11 with a constant degree of adhesion, so that the light guide plate 11 can be accurately rotated. Therefore, it is possible to accurately display a stereoscopic image and a planar image to the viewer 40.

Fourth Embodiment

A fourth embodiment will be described with reference to FIG. 9. Descriptions of contents overlapping those in the embodiments described above will be omitted.

In the fourth embodiment, the rotating cylinder 34 and the light guide plate 11 are brought into close contact with each other with high accuracy by using the urging member 35, thereby ensuring the rotation of the light guide plate 11. As described above, in the rotation due to close contact between the rotating cylinder 34 and the light guide plate 11, there is no unevenness on the rotation surface, namely, the side surface of the light guide plate 11 and the outer circumference of the rotating cylinder 34, so that smooth rotation can be realized. On the other hand, since a structure where the rotating cylinder 34 and the light guide plate 11 are engaged with each other is not formed, it is not always possible to pass all the rotation amount of the rotating cylinder 34 on to the rotation amount of the light guide plate 11 by sliding or the like. In particular, when the elasticity of rubber, urethane or the like on the outer circumference of the rotating cylinder 34 deteriorates due to long-term use, the rotating cylinder 34 may slip and a slight idle state of the rotating cylinder 34 may occur. In the embodiment, a rotating gear 36 is provided instead of the rotating cylinder 34, and the rotational force of the rotating cylinder 34 is reliably transmitted to the light guide plate 11 by meshing of the gear teeth.

Figure 9:
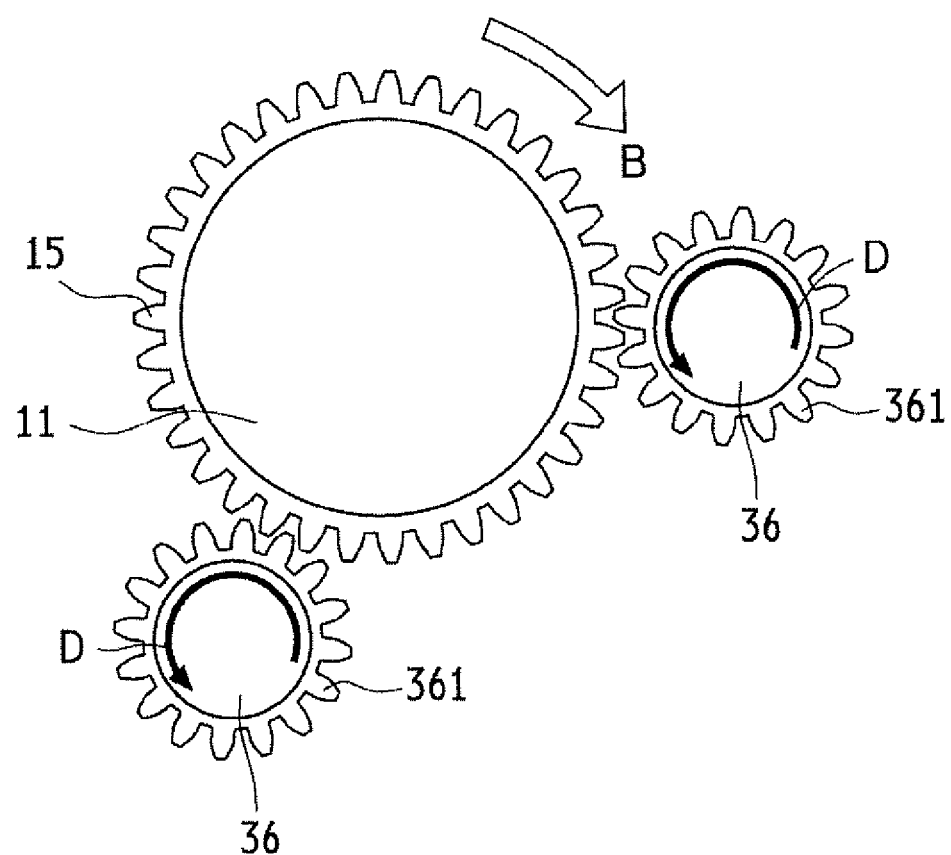
FIG. 9 is a schematic top view illustrating a display device of a fourth embodiment.

As illustrated in FIG. 9, in the light guide plate 11 of the embodiment, teeth 15 are formed on the side surface at regular intervals. It is desirable that the teeth 15 be integrally formed of the same material as the light guide plate 11. The rotator 30 is provided with the rotating gear 36, a rotation mechanism such as a rotating shaft and a motor (not illustrated) connected to the rotating gear 36. The rotating gear 36 has a structure in which teeth 361 formed on the outer circumference mesh with the teeth 15 of the light guide plate 11 and rotate the light guide plate 11 by a predetermined amount with rotation of the rotating gear 36. The number of the teeth 15 and the number of the teeth 361 may only be set based on the interval of a known gear meshing structure and is appropriately adjusted together with the diameter of the rotating gear, the diameter of the light guide plate 11, and the like.

In the embodiment, the light guide plate 11 is held by the two rotating gears 36, but the number of the rotating gears 36 is not particularly limited, and may be appropriately provided at an interval capable of efficiently holding the light guide plate 11.

As in the second embodiment, a plurality of light sources 20 may be configured to be disposed at positions close to the end portion of the light guide plate 11, or may be configured to be joined to the back surface 13 of the light guide plate 11. Since the teeth 15 are formed on the side surface of the light guide plate 11, a structure is desirably formed in which light is incident from a position avoiding the tip of the tooth 15 so that light is not scattered by the tip of the tooth 15.

As thus described, since the light guide plate 11 is rotated by meshing between the rotating gear 36 and the teeth 15 of the light guide plate 11, the light guide plate 11 can be held without using the urging member 35 or the like. In addition, since the teeth 361 of the rotating gear 36 mesh with each other and rotate, the teeth 361 are always engaged with the light guide plate 11, and the rotating gear 36 does not idle. Therefore, the rotation of the light guide plate 11 with a small amount of rotation can be reliably controlled, and hence the rotation can be matched with the light emission timing of the light source 20, thereby enabling more highly accurate presentation.

In addition, the rotation mechanism for rotating the rotating gear 36 may be structured to be rotated with a hand instead of being automatically rotated by the automatic operation of a motor or the like. The hand-rotation structure may be a known power transmission structure using a plurality of gears. By adopting the hand-rotation structure in this manner, a stereoscopic image and a planar image are switched by the hand-rotation speed of the viewer 40. Hence the image jumps out or retracts at an unexpected timing by the hand-rotation of the viewer 40, it is possible to perform new presentation with irregularity not in automatic rotation.

Fifth Embodiment

A fifth embodiment will be described with reference to FIGS. 10A to 10C. Descriptions of contents overlapping those in the embodiments described above will be omitted.

In the first embodiment, a description has been given of the light source 20 being joined to the light guide plate 11 and moving together with the light guide plate 11. In the second embodiment, the mode has been described in which the two light sources 20 are installed separately from the light guide plate 11 at the positions close to the end portion of the light guide plate 11, the positions respectively corresponding the first position where the image is viewed as a stereoscopic image by the rotation of the light guide plate 11 and the second position rotated 90 degrees from the first position.

In the embodiment, a mode will be described in which the light source 20 is not joined to the light guide plate 11, a plurality of the light sources 20 are arranged close to each other, and light can also be emitted between the first position and the second position.

FIGS. 10A to 10C are schematic views each illustrating the relationship between the light guide plate 11 and a light source 21 of the embodiment, where FIG. 10A is a schematic front view at the first position where the image is viewed as a stereoscopic image, FIG. 10B is a schematic perspective view illustrating the first position where the image is viewed as a stereoscopic image, and FIG. 10C is a schematic perspective view illustrating the second position where the image is viewed as a planar image.

In a display device according to the embodiment, light sources 21$b$, 21$c$ are arranged at equal intervals between a light source 21$a$ corresponding to the first position of the light guide plate 11 and a light source 21$d$ corresponding to the second position that is rotated 90 degrees. The light sources 21$a$ to 21$d$ are not joined to the light guide plate 11 but are provided in positions facing each other in close to the side end portion of the light guide plate 11.

The light guide plate 11 has a circular flat plate shape, and an image is formed at the center of the main surface 12. As shown in the first embodiment, the rotator 30 has a shape in which the base plate 31 and the shaft 32 are attached to the back surface 13.

The light sources 21$a$ to 21$d$ sequentially light up in accordance with the rotation of the light guide plate 11 in the direction of arrow E, and emit light to the side end of the light guide plate 11. As in the second embodiment, the turning on and turning off of the light sources 21$a$ to 21$d$ may be controlled based on the rotation amount of the rotator 30, or may be controlled by reading the mark on the side end portion of the light guide plate 11 with sensors (not illustrated) provided in the respective light sources 21$a$ to 21$d$ and using the reading. Since the plurality of light sources 21$a$ are provided, it appears to the viewer 40 that the switching interval among the light sources 21$a$ to 21$d$ is short and visually, continuous lighting is being performed. Note that the number of the light sources 21 is not limited to four, but may be appropriately set in accordance with the size of the light guide plate 11 and the emission range of light from the light source 21.

As shown in the first embodiment, in the structure in which the light source 20 is joined to the light guide plate 11 and rotated together with the light guide plate 11, the number of the light sources 20 may be small, but the wiring for supplying a signal and electric power to the light source 20 also needs to be routed in accordance with the rotation, and the space and the like for routing the wiring have been necessary. Since the light source 21 in the embodiment does not move together with the light guide plate 11 but is fixed in the vicinity of the light guide plate 11, the routing of the wiring in accordance with the rotation of the light guide plate 11 is unnecessary. Although light sources 21 increase in number but can be configured with a simple wiring structure.

Further, a plurality of light sources 21 are provided not only at two places that are a place corresponding to the first position of the light guide plate 11 and a position corresponding to the second position, but also between the first position and the second position. Thereby, a visually almost continuous lighting state is held and a state is shown in which the orientation of the image gradually changes, thus smoothly displaying the change from the stereoscopic image to the planar image.

In the embodiment, the light guide plate 11 rotates in the direction of arrow E in FIG. 10A, but the direction of rotation is not limited thereto, and may be the opposite direction. Further, the arrangement of the light sources 21 is not limited to the left side, but may be on the right side or the like.

Sixth Embodiment

A sixth embodiment will be described with reference to FIGS. 11A to 11C. Descriptions of contents overlapping those in the embodiments described above will be omitted.

In the embodiment, a case where the projector 10 has a cylindrical shape will be described.

Figure 11A:
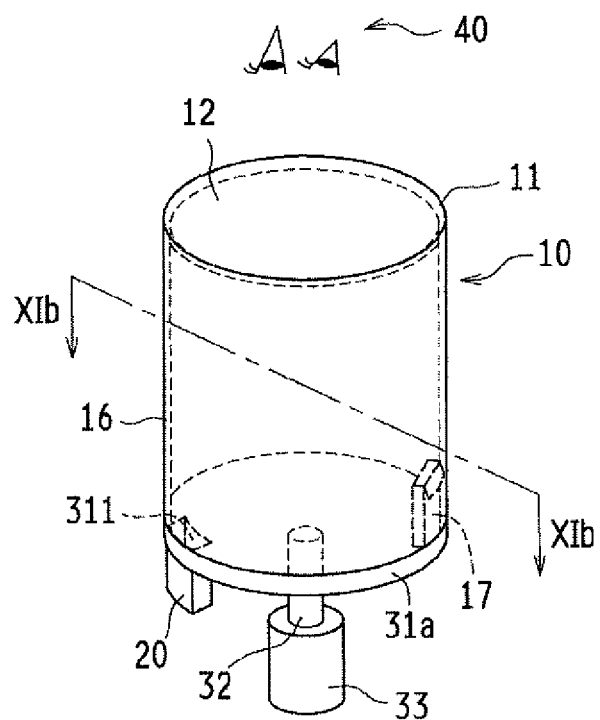
FIGS. 11A to 11C are schematic views each illustrating a display device 1 according to a sixth embodiment, where
Figure 11B:
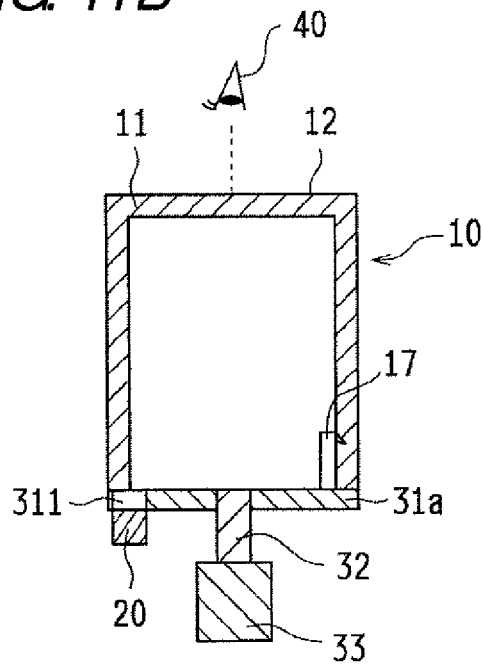
Figure 11C:
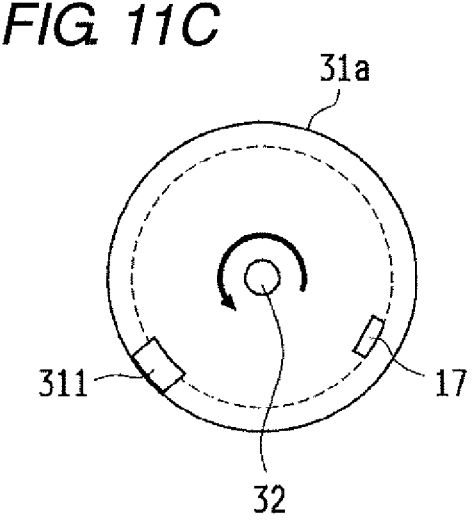

FIG. 11A is a schematic perspective view of a display device of the embodiment, FIG. 11B is a sectional view obtained by cutting out FIG. 11A along line XIb-XIb, and FIG. 11C is a schematic view of a base plate 31$a$ as seen from above.

The projector 10 is a transparent cylinder, and the bottom portion thereof is joined to the rotator 30. A circular top surface that faces the bottom portion is the light guide plate 11 having a circular flat plate shape. The main surface 12 of the light guide plate 11 is located on the outside of the cylinder and faces the viewer 40. In addition, a light guide path 16 is formed on the cylindrical side surface so as to connect from the light incident position on the light guide plate 11 to the bottom surface of the projector 10.

The rotator 30 includes the base plate 31, the shaft 32, and the rotation mechanism 33 such as a motor. The base plate 31 has a circular flat plate shape with a diameter such that the cylinder of the projector 10 is placed with the diameter therewithin. In FIG. 11C, as indicated by a broken line along the circumference of the base plate 31, the bottom portion of the projector 10, namely the end of the cylindrical side surface, is in contact with the surface of the base plate 31. The projector 10 is fixed to the base plate 31 by an engagement member 17. As in the first embodiment, the base plate 31 rotates with the rotation of the rotation mechanism 33 around the shaft 32 located at the center as the rotating shaft.

The place of the base plate 31 intersecting the light guide path 16 is open. The light source 20 is fixed to the back surface of the base plate 31 just below a base plate opening 311. The light source 20 emits light toward the light guide path 16, the light from the light source 20 passes through the base plate opening 311, and is emitted to the light guide plate 11 via the light guide path 16. The light guide plate 11 internally changes the optical path of the incident light from the incident position and emits the light from the main surface 12 to display an image.

Also, in the embodiment, the light source 20 emits light when coming to the first position and the second position in accordance with the rotation of the light guide plate 11, and displays an image. When the light guide plate 11 is at the first position, the image is viewed by the viewer 40 as a stereoscopic image. On the other hand, when the light guide plate 11 is rotated 90 degrees and is at the second position, the image is viewed as a planar image.

Since the projector 10 has a cylindrical shape as described above, a distance can be provided between the rotator 30 and the light guide plate 11, namely the projection surface. The installation is possible also in places where the rotator 30 cannot be directly joined to the light guide plate 11 for reasons of the space for installation, wiring, and the like. Further, since the rotator 30 is not directly attached to the back surface 13 of the light guide plate 11, the translucency at the center of the light guide plate 11 is not impaired.

Further, since the cylindrical portion of the projector 10 is transparent, by forming an image also on the cylindrical portion and partially irradiating a place other than the light guide path 16 with light from the light source, it is possible to create new presentation in combination between the image formed in the light guide plate 11 and the image of the cylindrical portion.

Seventh Embodiment

A seventh embodiment will be described with reference to FIGS. 12A to 12C. Descriptions of contents overlapping those in the embodiments described above will be omitted.

In the seventh embodiment, it has been configured such that the light source 20 is attached to the back surface of the base plate 31, and the light source 20 is moved together with the base plate 31. However, in the embodiment, a structure is formed in which a plurality of the light sources 21a to 21d are arranged at predetermined positions and do not move together with the light guide plate 11.

Figure 12A:
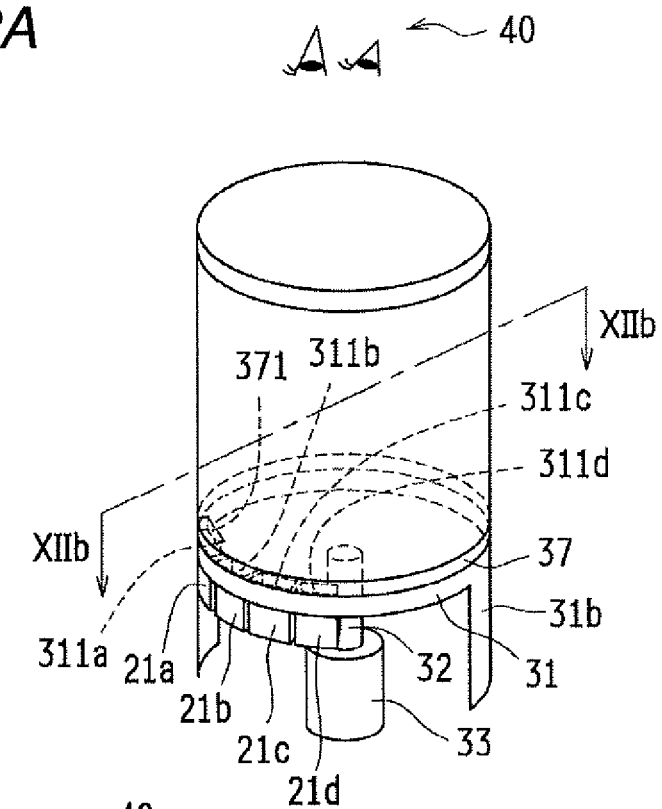
FIGS. 12A to 12C are schematic views each illustrating a display device 1 according to a seventh embodiment, where
Figure 12B:
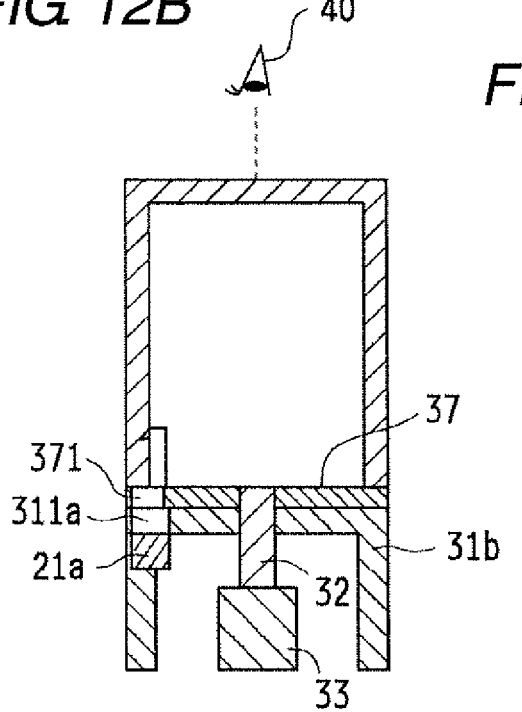
Figure 12C:
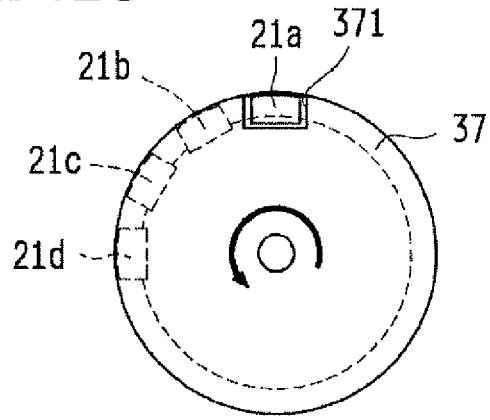

FIG. 12A is a schematic perspective view illustrating a display device of the embodiment, FIG. 12B is a sectional view obtained by cutting out FIG. 12A along line XIIb-XIIb, and FIG. 12C is a schematic view of a base 37 as seen from above.

As in the sixth embodiment, the projector 10 is a transparent cylinder, and its top surface is the light guide plate 11. Light from the light sources 21a to 21d is emitted to the light guide plate 11 via the light guide path 16 provided on the cylindrical side surface of the projector 10.

In the rotator 30 of the embodiment, the base 37 is placed on the base plate 31, and only the base 37 rotates as the shaft 32 rotates, and the base plate 31 does not rotate. Specifically, the base plate 31 has a base leg 31b, and is stood by the base leg 31b at a place where the display device is installed. The base 37 is placed on the base plate 31. The shaft 32 only passes through the center of the base plate 31 and is not fixed to the base plate 31 but is fixed to the base 37 placed on the base plate 31. The rotational force from the rotation mechanism 33 is transmitted only to the base 37, not transmitted to the base plate 31, the base 37 rotates but the base plate 31 does not rotate.

In FIG. 12C, the projector 10 is fixed to the base 37, and as indicated by a broken line along the circumference of the base plate 31, the bottom portion of the projector 10, namely the end of the cylindrical side surface, is in contact with the surface of the base 37. As in the fixing method in the sixth embodiment, the projector 10 is fixed by the engagement member 17. In the base 37, a place intersecting the light guide path 16 of the projector 10 is a base opening 371 which is open.

Four light sources 21 according to the embodiment are provided and are joined to the back surface which is the back surface of the surface of the base plate 31 on which the base 37 is placed. The light sources 20b and 20c are arranged at equal intervals between the light source 21a corresponding to the first position and the light source 20d corresponding to the second position that is rotated 90 degrees. Four openings, such as base plate openings 311a to 311d, are opened above the respective light emitting units of the light sources 21a to 21d in the base plate 31. That is, since the base plate 31 does not rotate, the base plate openings 311a to 311d are provided in accordance with the light sources 21a to 21d located on the back surface of the base plate 31.

Image projection is performed as follows. First, when the image is shown to the viewer 40 as a stereoscopic image, the base opening 371 is located right above the light source 21a. The light from the light source 21a passes through the base plate opening 311a, further passes through the base opening 371 overlapping thereabove, passes through the light guide path 16, is incident on the light guide plate 11, and projects an image. Since the light guide plate 11 is located at the first position, the image is viewed as a stereoscopic image by the viewer 40. Next, when, for example, the base 37 rotates 90 degrees with the rotation of the rotator 30, the base opening 371 is located on the light source 21d, and the light from the light source 21d passes through the light guide path 16 and is incident on the light guide plate 11 to project an image. As the base 37 rotates, the light guide plate 11 is located at the second position, so that the image is viewed as a planar image by the viewer 40. Note that not only such a type is used in which the light source 21 is turned on only when the light guide plate 11 is located at the first position and the second position, but as in the fifth embodiment, such a type may be used that four light sources of the light source 21a to the light source 21d are sequentially turned on with the movement of the base 37. This is a mechanism in which, when the base opening 371 is located above the light sources 21a to 21d, the light sources 21a to 21d emit light.

The base 37 rotates and the base plate 31 and the light source 21 do not rotate as thus described, thereby simplifying the wiring routing structure of the light source 21. Since the four light sources 21 are switched at short intervals in accordance with the movement of the projector 10 as in the fifth embodiment, in a state where the lighting state substantially visually continuous is held and the orientation of the image gradually changes, the change from a stereoscopic image to the planar image is displayed more smoothly.

The present invention is not limited to the embodiments described above, but can be subjected to a variety of changes in the scope shown in the claims. An embodiment obtained by appropriately combining technical units disclosed respectively in different embodiments is also included in a technical scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A display device comprising:
   a projector having a light guide plate that guides light incident from an end portion and deflects the light guided to emit the light from a projection surface facing a viewer in a first direction, the projector being configured to emit light from the projection surface to project an image in a space viewable by the viewer;

a rotator configured to rotate the projector around the first direction; and a plurality of light sources comprising a first light source and a second light source, wherein, when a first end on the projection surface is located at a first position being an upper side in a second direction orthogonal to the first direction, the image is viewed as a stereoscopic image by the viewer, wherein, when the rotator rotates the projector and the first end is located at a second position different from the first position, the image is viewed as a planar image by the viewer, wherein the first light source extinguishes light when the rotator rotates the projector, and the first light source emits light when the first end of the projector is located at the second position based on a rotation instruction of the rotator, and wherein when the first end is located at the second position, the second light source emits light, the second light source being different from the first light source that emits light when the first end is located at the first position.

2. The display device according to claim 1, wherein the second position is an upper side in a third direction orthogonal to the first direction and the second direction.

3. The display device according to claim 2, wherein the rotator is connected to a back surface of the projection surface of the projector to rotate the projector.

4. The display device according to claim 2, wherein the rotator is connected to a side end portion of the projection surface of the projector to rotate the projector.

5. The display device according to claim 2, wherein the rotator rotates the projector at a timing not based on viewer's instruction.

6. The display device according to claim 1, wherein the rotator is connected to a back surface of the projection surface of the projector to rotate the projector.

7. The display device according to claim 6, wherein the rotator rotates the projector at a timing not based on viewer's instruction.

8. The display device according to claim 1, wherein the rotator is connected to a side end portion of the projection surface of the projector to rotate the projector.

9. The display device according to claim 8, wherein the rotator rotates the projector at a timing not based on viewer's instruction.

10. The display device according to claim 1, wherein the first light source moves with rotation of the projector.

11. The display device according to claim 10, wherein the rotator rotates the projector at a timing not based on viewer's instruction.

12. The display device according to claim 1, wherein the rotator rotates the projector at a timing not based on viewer's instruction.

13. A game machine comprising the display device according to claim 1.

14. A display method in a display device including:

a projector having a light guide plate that guides light incident from an end portion and deflects the light guided to emit the light from a projection surface facing a viewer in a first direction, the projector being configured to emit light from the projection surface to project an image in a space viewable by the viewer;

a rotator configured to rotate the projector around the first direction; and a plurality of light sources comprising a first light source and a second light source, wherein the display method comprises:

a stereoscopic image viewing step in which the rotator rotates the projector such that a first end on the projection surface is located at a first position being an upper side in a second direction orthogonal to the first direction, to cause the viewer to view the image as a stereoscopic image; and a planar image viewing step in which the rotator rotates the projector such that the first end is located at a second position different from the first position, to cause the viewer to view the image as a planar image, wherein the first light source extinguishes light when the rotator rotates the projector, and the first light source emits light when the first end of the projector is located at the second position based on a rotation instruction of the rotator, and wherein when the first end is located at the second position, the second light source emits light, the second light source being different from the first light source that emits light when the first end is located at the first position.

* * * * *